US008849120B2

(12) United States Patent
Nagarajan et al.

(10) Patent No.: US 8,849,120 B2
(45) Date of Patent: Sep. 30, 2014

(54) WAVELENGTH DIVISION MULTIPLEXED PASSIVE OPTICAL NETWORK

(75) Inventors: Radhakrishnan L. Nagarajan, Cupertino, CA (US); Christopher C. Liou, Cupertino, CA (US); Masaki Kato, Palo Alto, CA (US)

(73) Assignee: Infinera Corporation, Sunnyvale, CA (US)

( * ) Notice: Subject to any disclaimer, the term of this patent is extended or adjusted under 35 U.S.C. 154(b) by 294 days.

(21) Appl. No.: 12/987,671

(22) Filed: Jan. 10, 2011

(65) Prior Publication Data
US 2012/0057875 A1 Mar. 8, 2012

Related U.S. Application Data

(60) Provisional application No. 61/380,580, filed on Sep. 7, 2010.

(51) Int. Cl.
*H04J 14/02* (2006.01)

(52) U.S. Cl.
CPC ......... *H04J 14/0282* (2013.01); *H04J 14/0265* (2013.01); *H04J 14/0298* (2013.01); *H04J 14/0246* (2013.01); *H04J 14/025* (2013.01); *H04J 2014/0253* (2013.01)
USPC .................. 398/84; 398/71; 398/68; 398/43; 398/139; 398/141

(58) Field of Classification Search
None
See application file for complete search history.

(56) References Cited

U.S. PATENT DOCUMENTS

2006/0104638 A1* 5/2006 Chung et al. ............... 398/71
2006/0133730 A1* 6/2006 Shin et al. .................. 385/37
2010/0202774 A1* 8/2010 Yu .............................. 398/49

FOREIGN PATENT DOCUMENTS

CN 101420285 A * 4/2009

* cited by examiner

*Primary Examiner* — Ken Vanderpuye
*Assistant Examiner* — David Lambert
(74) *Attorney, Agent, or Firm* — David L. Soltz

(57) ABSTRACT

Consistent with the present disclosure, an optical communication system, such as a passive optical network (PON), is provided that includes an optical line terminal (OLT) and a plurality of optical network units (ONUs). The OLT includes a plurality of photonic integrated circuits that have both optical transmitters and receivers provided therein. Accordingly, the OLT may have fewer components and a simpler, more reliable and cost-effective design than a conventional OLT including discrete components. In addition, various ONU configurations are provided that also have a simple design and fewer components. Thus, ONUs consistent with the present disclosure may also have reduced costs.

12 Claims, 14 Drawing Sheets

PIC1

WAVELENGTH DIVISION MULTIPLEXED PASSIVE OPTICAL NETWORK

This application claims the benefit of U.S. Provisional Application No. 61/380,580, filed Sep. 7, 2010, the entire contents of which are incorporated herein by reference.

BACKGROUND

Access networks are known which connect a telecommunications service provider's central office (CO) or point-of-presence (POP) to businesses and residential subscribers. Passive optical networks (PONs) are a type of access network in which a so-called optical line terminal (OLT) is provided in a central office to transmit and receive optical signals carrying data to and from remote optical network units (ONUs) provided at or near a subscriber's or customer's premises.

In conventional PONs, one or more 1:N optical splitters may be provided to distribute optical signals from the OLT to the ONUs, and optical power combiners may be provided to aggregate optical signals transmitted by the ONUs to the OLT. Earlier PONs transmitted optical signals in a downstream direction from the OLT to the ONUs at a single wavelength, such as 1490 nm, while optical signals transmitted in an upstream direction by the ONUs to the OLT were transmitted at a different wavelength, e.g., 1310 nm.

Wavelength division multiplexing (WDM) has recently been proposed as a technique for increasing the capacity of PONs. In a WDM-based PON, a plurality of optical signals, each at a corresponding one of a plurality of wavelengths, is transmitted in both the upstream and downstream directions. Since each optical signal can carry a data stream independent of the other optical signals, the information carrying capacity of WDM-based PONs may be greater than that of earlier PONs in which optical signals are time shared by each ONU.

Since a PON may include a relatively large number of ONUs, there is a need for each ONU to be relatively inexpensive and be manufacturable based on a relatively simple design. Similarly, the cost of the OLT should also be preferably reduced.

SUMMARY

Consistent with an aspect of the present disclosure, an apparatus is provided that may be provided in an OLT. The apparatus comprises a substrate and a plurality of optical sources is provided on the substrate. Each of the plurality of optical sources supplies a corresponding one of a first plurality of optical signals, each of which having a corresponding one of a first plurality of wavelengths. A plurality of photodiodes and a first arrayed waveguide grating (AWG) are also provided on the substrate. The first AWG has a plurality of first input waveguides and a second input waveguide, and a first output waveguide and a plurality of second output waveguides. Each of the plurality of first input waveguides receives a corresponding one of the first plurality of optical signals, and the second output waveguide supplies a first wavelength division multiplexed (WDM) optical signal. In addition, the second input waveguide receives a second WDM optical signal including a second plurality of optical signals, each of which having a corresponding one of a second plurality of wavelengths. Further, each of the plurality of second output waveguides supplies a corresponding one of the second plurality of optical signals to a respective one of the plurality of photodiodes. Moreover, the apparatus includes a second AWG having an input waveguide that receives the first WDM optical signal and a plurality of output waveguides. Each of the first plurality of wavelengths is spectrally spaced from one another such that the first WDM optical signal is output from one of the plurality of output waveguides of the second AWG.

Various ONUs are also provided. One such ONU includes a port that receives a first optical signal and outputs a second optical signal. A first tap is also provided that receives the first optical signal from the port and has first and second outputs. The first tap receives the first optical signal from the port, and the first output of the first tap supplies a first portion of the first optical signal. The second output of the first tap supplies a second portion of the first optical signal. An optical receiver circuit is also provided that is configured to receive the first portion of the first optical signal. In addition, a transmitter is provided that supplies an output optical signal, which has a wavelength. In addition, a second optical tap is provided that has an input and first and second outputs. The first output of the second optical tap supplies a first portion of the output optical signal as the second optical signal, and the second output of the second optical tap supplies a second portion of the output optical signal. An optical coupler is further provided that has first and second inputs and an output. The first input of the optical coupler receives the second portion of the first optical signal and the second input of optical coupler receives the second portion of the output optical signal. Also, the output of the optical coupler supplies a combined optical signal including the second portion of the first optical signal and the second portion of the output optical signal. Moreover, photodetector and control circuits are provided. The photodetector circuit is receives the combined optical signal and generates an electrical signal in response thereto. The control circuit is configured to adjust the wavelength of the output optical signal in response to the electrical signal.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the disclosure.

DESCRIPTION OF THE EMBODIMENTS

Consistent with the present disclosure, an optical communication system, such as a passive optical network (PON), is provided that includes an optical line terminal (OLT) and a plurality of optical network units (ONUs). The OLT includes a plurality of photonic integrated circuits that have both optical transmitters and receivers provided therein. Accordingly, the OLT may have fewer components and a simpler, more reliable and cost-effective design than a conventional OLT including discrete components. In addition, various ONU configurations are provided that also have a simple design and fewer components. Thus, ONUs consistent with the present disclosure may also have reduced costs.

Reference will now be made in detail to the following exemplary embodiments of the present disclosure, a examples of which are illustrated in the accompanying drawings. Wherever possible, the same reference numbers will be used throughout the drawings to refer to the same or like parts.

Figure 1:
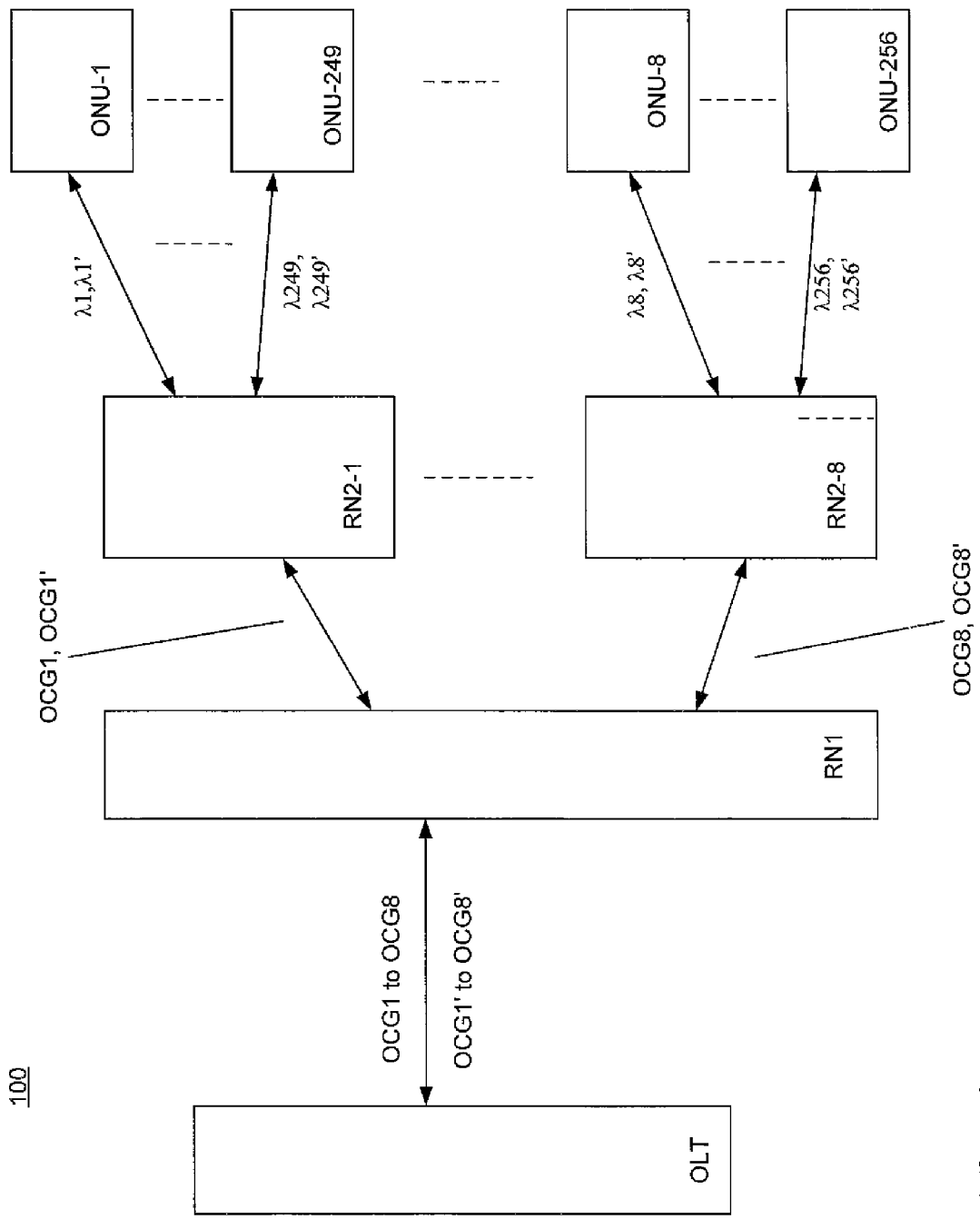
FIG. 1 illustrates a block diagram of an optical communication system consistent with the present disclosure.

FIG. 1 illustrates a block diagram of PON 100, which is an optical communication system consistent with the present disclosure. PON 100 includes an OLT that outputs optical carrier groups (OCGs) OCG1 to OCG8 and receives optical carrier groups OCG1' to OCG8', for example. Each of optical carrier group includes a plurality of optical signals, in this example, thirty-two, and each optical signal has a corresponding one of a plurality of wavelengths. Table 1 below lists the optical signal wavelengths associated with each optical carrier group OCG1 to OCG8.

TABLE 1

| Optical Carrier Group | Optical Signal Wavelengths |
| --- | --- |
| OCG1 | $\lambda 1, \lambda 9, \lambda 17, \lambda 25 \ldots \lambda 249$ |
| OCG2 | $\lambda 2, \lambda 10, \lambda 18, \lambda 26 \ldots \lambda 250$ |
| OCG3 | $\lambda 3, \lambda 11, \lambda 19, \lambda 27 \ldots \lambda 251$ |
| OCG4 | $\lambda 4, \lambda 12, \lambda 20, \lambda 28 \ldots \lambda 252$ |
| OCG5 | $\lambda 5, \lambda 13, \lambda 21, \lambda 29 \ldots \lambda 253$ |
| OCG6 | $\lambda 6, \lambda 14, \lambda 22, \lambda 30 \ldots \lambda 254$ |
| OCG7 | $\lambda 7, \lambda 15, \lambda 23, \lambda 31 \ldots \lambda 255$ |
| OCG8 | $\lambda 8, \lambda 16, \lambda 24, \lambda 32 \ldots \lambda 256$ |

Table 2 below lists the optical signal wavelengths associated with each optical carrier group OCG1' to OCG8'.

TABLE 2

| Optical Carrier Group | Optical Signal Wavelengths |
| --- | --- |
| OCG1' | $\lambda 1', \lambda 9', \lambda 17', \lambda 25' \ldots \lambda 249'$ |
| OCG2' | $\lambda 2', \lambda 10', \lambda 18', \lambda 26' \ldots \lambda 250'$ |
| OCG3' | $\lambda 3', \lambda 11', \lambda 19', \lambda 27' \ldots \lambda 251'$ |
| OCG4' | $\lambda 4', \lambda 12', \lambda 20', \lambda 28' \ldots \lambda 252'$ |
| OCG5' | $\lambda 5', \lambda 13', \lambda 21', \lambda 29' \ldots \lambda 253'$ |
| OCG6' | $\lambda 6', \lambda 14', \lambda 22', \lambda 30' \ldots \lambda 254'$ |
| OCG7' | $\lambda 7', \lambda 15', \lambda 23', \lambda 31' \ldots \lambda 255'$ |
| OCG8' | $\lambda 8', \lambda 16', \lambda 24', \lambda 32' \ldots \lambda 256'$ |

Each of optical signal wavelengths $\lambda 1$ to $\lambda 256$ may or may not be spectrally offset from a corresponding one of optical signal wavelengths $\lambda 1'$ to $\lambda 256'$. If the optical signal wavelengths are offset from each other, such offset is typically small (e.g., the difference between $\lambda 1$ and $\lambda 1'$ is small) but sufficient to prevent cross-talk between the upstream and downstream optical signals. The offset should be sufficiently small so that $\lambda 1$ and $\lambda 1'$ are within the passband of the cyclic AWG, e.g., 290 and 210, and is typically some fraction of the channel spacing. Also, each of optical signals wavelengths $\lambda 1$ to $\lambda 256$ and $\lambda 1'$ to $\lambda 256'$ is typically within a relatively narrow range about 1550 nm. For ease of explanation, the symbols $\lambda 1$ to $\lambda 256$ and $\lambda 1'$ to $\lambda 256'$ may refer to both the wavelength of an optical signal as well as the optical signal itself.

As further shown in FIG. 1, optical carrier groups OCG1 to OCG8 is supplies from the OLT to a first remote node, RN1, which supplies a corresponding one of optical carrier groups OCG1 to OCG8 to a respective one of additional remote nodes, RN2-1 to RN2-8. In addition, each of remote nodes RN2-1 to RN2-8 supplies a corresponding one of optical carrier groups OCG1' to OCG8' to remote node RN1, which multiplexes or combines OCG1' to OCG8' into a WDM signal that is supplied to the OLT.

Each of remote nodes RN2-1 to RN2-8 demultiplexes the optical signals within each optical carrier group supplied thereto and supplies each demultiplexed optical signal to a corresponding optical network unit (ONU). For example, as shown in FIG. 1, remote node RN2-1 supplies each of optical signals $\lambda 1, \lambda 9, \lambda 17, \lambda 25 \ldots \lambda 249$ in optical carrier group OCG1 (also a WDM optical signal) to a corresponding one of optical network units ONU-1, ONU-9, ONU-17, ONU-25 . . . ONU-249 (32 in all, in this example). For ease of illustration only optical network units ONU-1 to ONU-249 are shown in FIG. 1. As described in greater detail below, each ONU converts the received optical signal into a corresponding electrical signal, which is then processed and the data or data stream associated with the received optical signal is output from the ONU. In a similar fashion each optical signal within optical carrier group OCG8 is output to a respective one of ONUs ONU-8, ONU-16, ONU-24 . . . ONU-256.

Each of ONUs ONU-1 to ONU-249 shown in FIG. 1 supplies a corresponding one of optical signals having wavelengths $\lambda 1', \lambda 9', \lambda 17', \lambda 25' \ldots \lambda 249'$ to RN2-1, which multiplexes or combines these optical signals into optical carrier group OCG1' (also a WDM optical signal). OCG1', as noted above, is next supplied to remote node RN1 and combined with the other OCGs, namely OCG2 to OCG8 to provide a further WDM optical signal that is output to the OLT.

Figure 2:
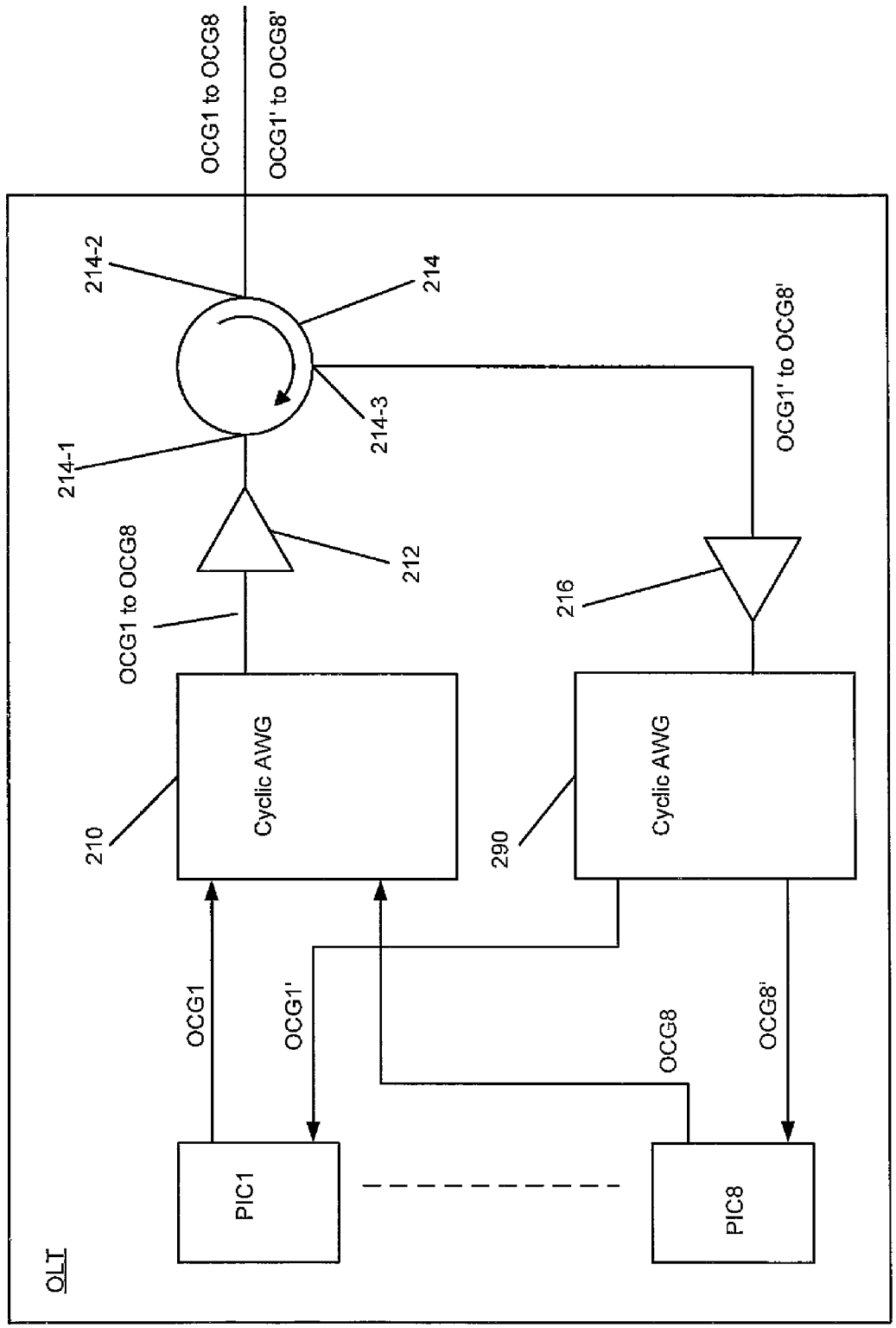
FIG. 2 illustrates an exemplary OLT consistent with the present disclosure.

FIG. 2 shows the OLT in greater detail. The OLT includes a plurality of photonic integrated circuits (PICs) 1 to 8, each of which supplying a corresponding one of a plurality of optical carrier groups OCG1 to OCG8 to an arrayed waveguide grating (AWG) 210 configured as a so-called "cyclic" AWG. AWG 210 multiplexes or combines OCG1 to OCG8 into a WDM optical signal that is supplied to an optional optical amplifier, such as erbium doped fiber amplifier (EDFA) 212. The amplified optical carrier groups OCG1 to OCG8 are supplies to port 214-1 of optical circulator 214 and output on portion 214-2.

As further shown in FIG. 2, incoming or downstream originating optical carrier groups OCG1' to OCG8' constituting a WDM optical signal, for example, are input to port 214-2 and output on port 214-3. These optical carrier groups may then be amplified by EDFA 216, for example, and supplied to AWG 290 (also a "cyclic" AWG), which supplies or outputs each of OCG1' to OCG8' to a corresponding one of photonic integrated circuits PIC1 to PIC8.

Figure 3:
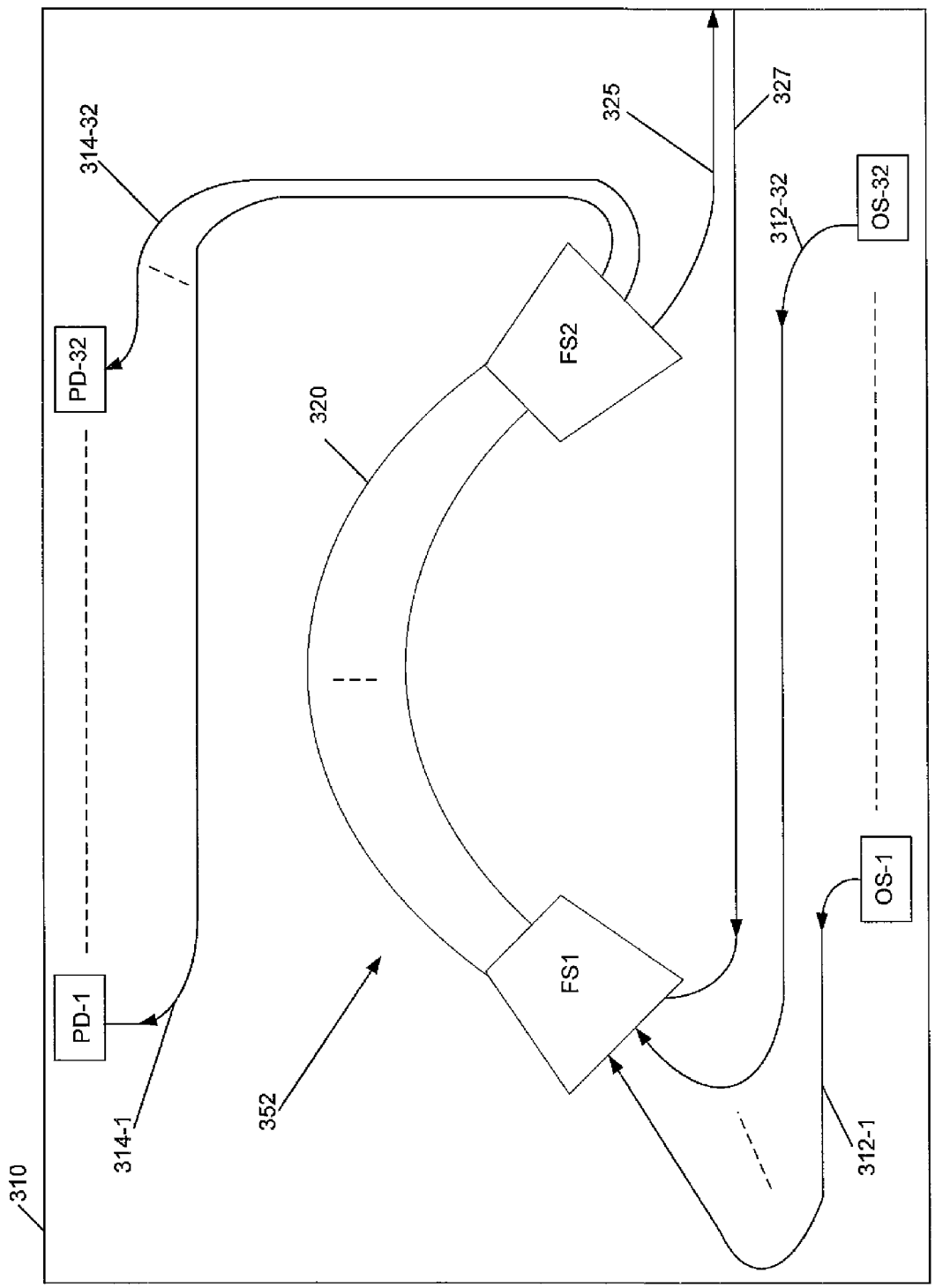
FIG. 3 illustrates an exemplary transceiver photonic integrated circuit consistent with an aspect of the present disclosure.

Photonic integrated circuit PIC1 is shown in greater detail in FIG. 3. Typically, remaining photonic integrated circuits PICs 2-8 (see FIG. 2) have the same or similar structure as PIC1. PIC1 includes a substrate 310, upon which optical sources OS1 to OS8 are provided. Optical sources OS1 to OS32 supply each optical signal within optical carrier group OCG1, namely optical signals having wavelengths $\lambda 1, \lambda 9, \lambda 17, \lambda 25 \ldots \lambda 249$ (collectively constituting a "WDM optical signal"). Each optical signal is supplied via a corresponding one of input waveguides 312-1 to 312-32 to free space region FS1 of AWG 352. AWG 352 also includes waveguides 320 and an additional free space region FS2 that are configured so that the optical signals having wavelengths $\lambda 1, \lambda 9, \lambda 17, \lambda 25 \ldots \lambda 249$ are combined and supplied on output waveguide 325 to AWG 210 shown in FIG. 2. Each optical signal in optical carrier group OCG1, as well as the other optical carrier groups OCG2 to OCG8 may be modulated to carry data or information. Such optical signals may be modulated in accordance with a known format and in response to electrical signals supplied to each of optical sources OS1 to OS32.

Each of optical sources OS1 to OS32 may include a laser, modulator and other optical and/or electrical components. Exemplary optical sources are described in U.S. Pat. No. 7,466,882 and U.S. patent application Ser. No. 12/961,236, the contents of which are incorporated herein by reference.

As further shown in FIG. 3, an additional input waveguide 327 may be provided to feed optical carrier group OCG1' received from AWG 210 to dielectric slab or free space region FS1. AWG 352 may be further configured so that each optical signal in optical carrier group OCG1' (optical signals having wavelengths λ1', λ9', λ17', λ25' ... λ249', collectively constitute a "WDM optical signal") is output from dielectric slab or free space region FS2 on a respective one of output waveguides 314-1 to 314-32. Each optical signal is then provided to a corresponding one of photodiodes PD1 to PD32. Each photodiode, in turn, generates a corresponding electrical signal that is further processed to demodulate and output data or a data stream carried by each optical signal in OCG1'.

Since PIC1 includes optical sources OS1 to OS32 and photodiodes PD1 to PD32 integrated or provided on a common substrate 310, the cost of the OLT is reduced compared to a conventional OLT including discrete components. Moreover, the same AWG, i.e., AWG 352 may be used to both multiplex the optical signals output from OS1 to OS32 into optical carrier group OCG1, as well as demultiplex the received optical signals of optical carrier group OCG1', thereby further reducing costs and simplifying the design of PIC1.

Figure 4:
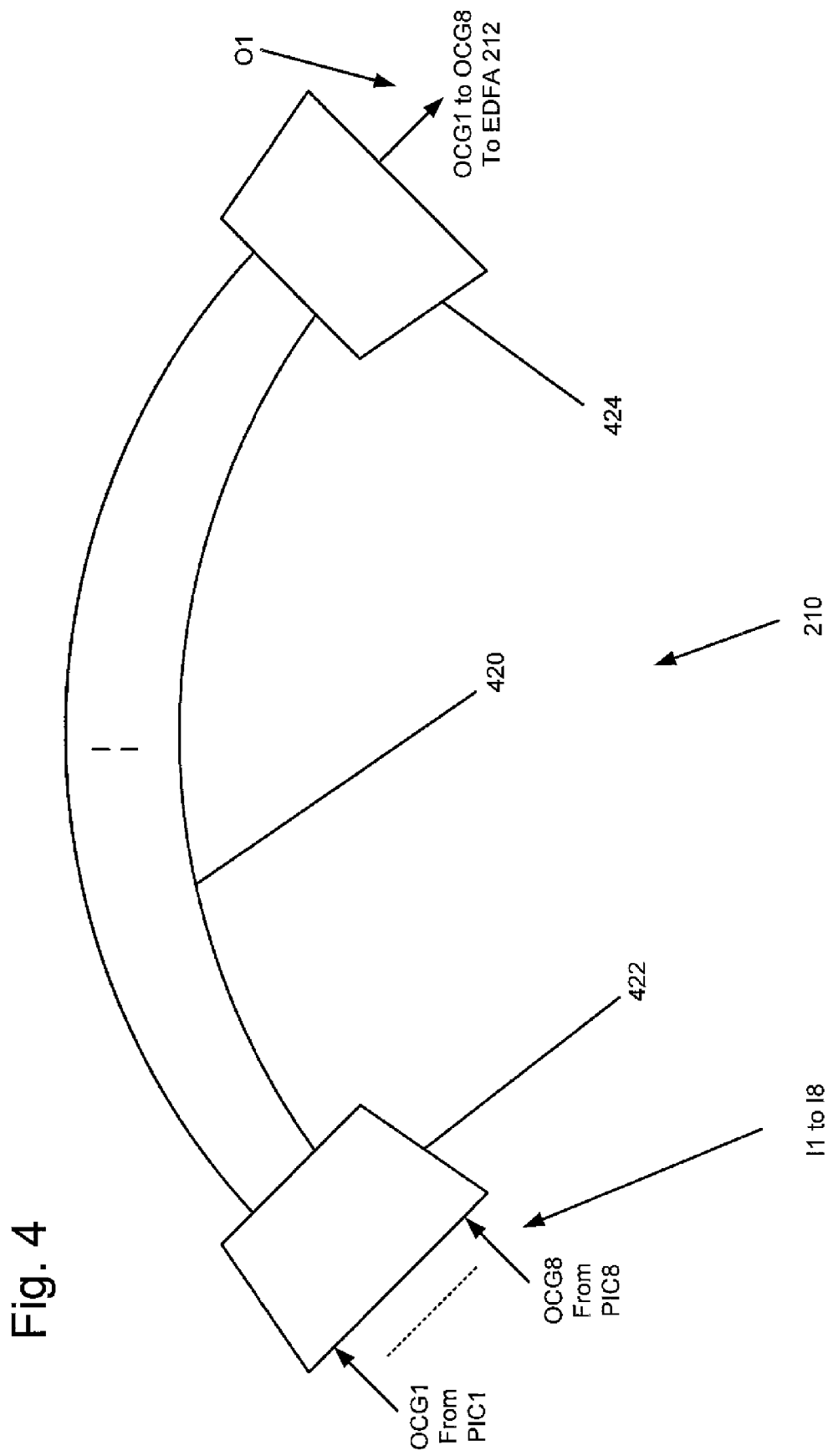
FIG. 4 illustrates an exemplary arrayed waveguide grating consistent with the present disclosure.

FIG. 4 illustrates AWG 210 in greater detail. As noted above, AWG 210 may be a "cyclic" AWG. AWG 290 may have the same or similar structure as AWG 290. AWG 210 includes a plurality of inputs, such as input/output waveguides I1 to I8 connected to a dielectric slab or free space region 422. Free space region 422 is connected to free space region 424 by a plurality of waveguides 420, each of which having a length that differs from an adjacent waveguide by an incremental amount. An output waveguide, such as waveguide O1, is coupled to free space region FS2.

As generally understood, the AWG output waveguide from which a particular optical signal is supplied depends on both the wavelength of the optical signal, as well as the position of the input waveguide that feeds the optical signal to the AWG. Here, each of wavelength associated with OCG1, namely, wavelengths λ1, λ9, λ17, λ25 ... λ249 may be spectrally spaced from one other such that each optical signal in OCG1 is supplied from output waveguide 428 of AWG 210. Likewise, each optical signal wavelength associated with optical carrier groups OCG2 to OCG8 and the position so input waveguides 430-1 to 430-32 is such that each of optical carrier groups OCG1 to OCG2 are supplied from AWG 210 on a common output waveguide 428.

In a similar manner, each of optical signal wavelengths associated with optical carrier groups OGC1' to OCG8', for example, and the positions of the input waveguide carrying the optical carrier groups and output waveguides of AWG 290 are such that each optical carrier group is provided on a corresponding one of outputs to a respective one of photonic integrated circuits PIC1 to PIC8.

Figure 5:
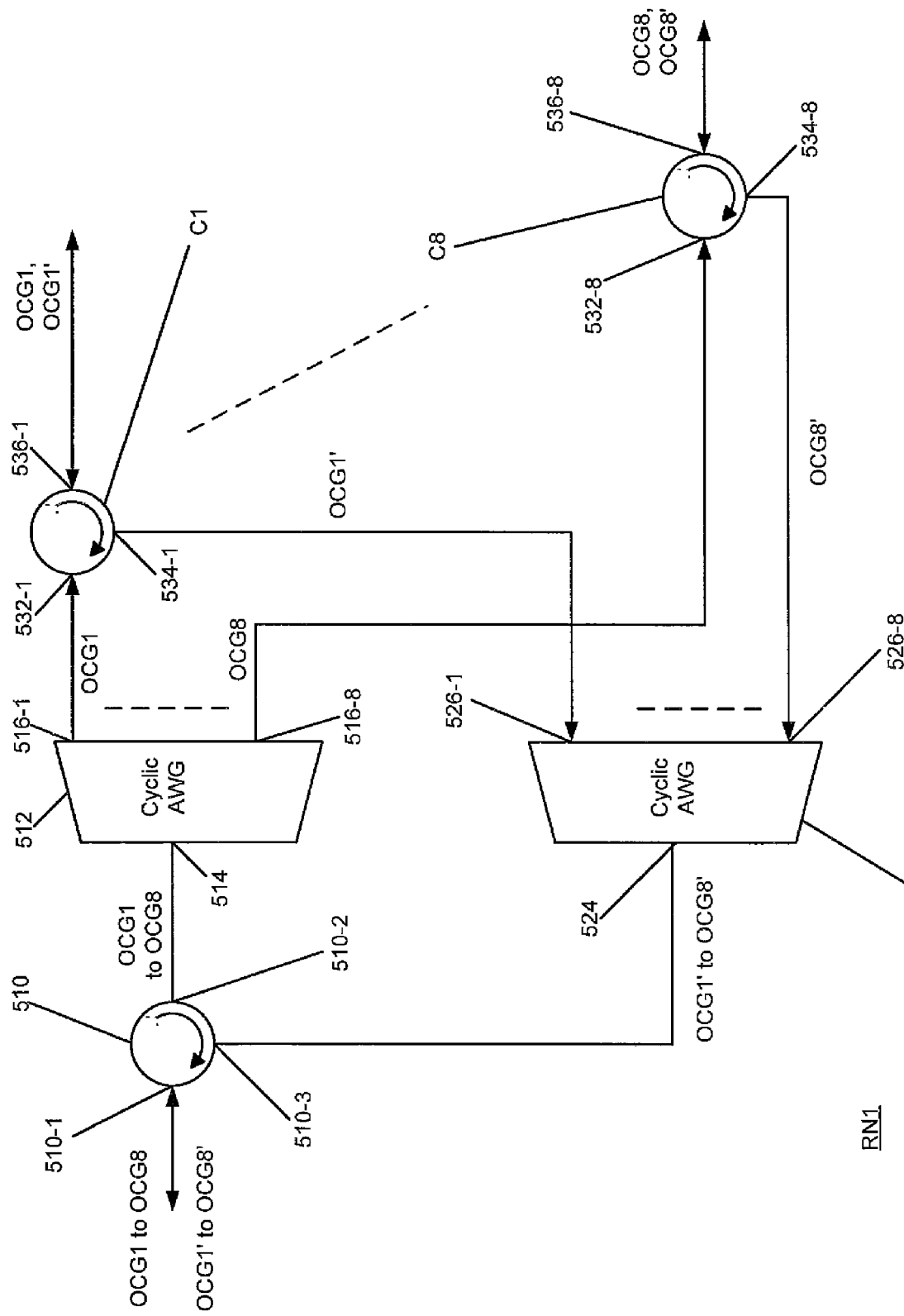
FIG. 5 is a block diagram showing details of an exemplary remote node shown in FIG. 1.

FIG. 5 illustrates remote node RN1, which, as noted above, receives optical carrier groups OCG1 to OCG8 from the OLT and outputs optical carrier groups OCG1' to OCG8' to the OLT. RN1 includes a circulator 510 having port 510-1 through which optical carrier groups OCG1 to OCG8 are input and optical carrier groups OCG1' to OCG8' are output. Optical carrier groups OCG1 to OCG8 are output from port 510-2 of circulator 510 to input waveguide 514 of AWG 512 (which may be a "cyclic" AWG similar to those noted above). AWG 514, in turn, supplies each of OCG1 to OCG8 at a corresponding one of output waveguides 516-1 to 516-8. Output waveguide 516-1 feeds OCG1 to port 532-1 of circulator C1, so that OCG1 is output from port 536-1 of circulator C1 to corresponding remote node RN2-1 (see FIG. 1). In a similar manner, output waveguides 516-2 to 516-8 supply a corresponding one of OCGs 2 to 8 to respective ports of circulators C2 to C8, so that these OCGs are then output through a second circulator port to a corresponding one of remote nodes RN2-2 to RN2-8 (see FIG. 1). For example, output waveguide 516-8 supplies OCG8 to port 532-8 of circulator C8, such that OCG8 is output from port 536-8 to corresponding remote node RN2-8.

As further shown in FIG. 5, downstream originating optical carrier groups OCG1' to OCG8' are supplied from respective remote nodes RN2-1 to RN2-8 to corresponding circulator ports 536-1 to 536-8. Each of circulators C1 to C8, in turn, output each of OCG1' to OCG8' to a corresponding one of input waveguides 526-1 to 526-8 via a respective one of circulator ports 534-1 to 534-8. AWG 522, also a "cyclic" AWG, may combine or multiplex each of OCG1' to OCG8' onto output waveguide 524, which directs these optical carrier groups to port 510-3 of circulator 510. Optical carrier groups OCG1' to OCG8' are next output to the OLT, as noted above.

Figure 6:
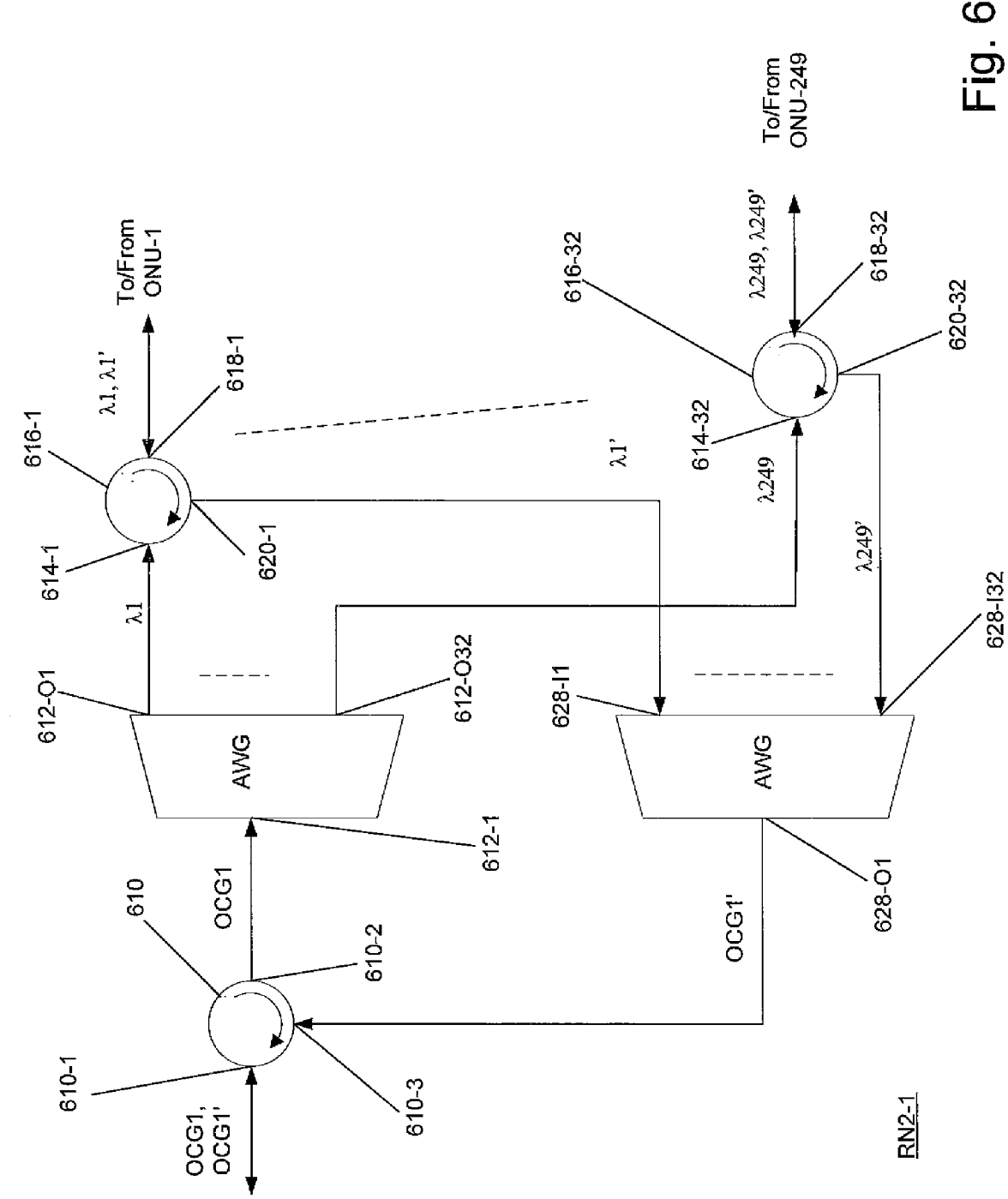
FIG. 6 is a block diagram showing details of an additional remote node shown in FIG. 1.

FIG. 6, illustrates an exemplary remote node RN2-1 associated with OCG1. It is understood that remaining remote nodes RN2-2 to RN2-8 have the same or similar structure as remote node RN2-1. Remote node RN2-1 demultiplexes each optical signal in OCG1 and supplies each demultiplexed optical signal to a corresponding one of 32 ONUs associated with OCG 1 (ONU-1, ONU-9, ONU-17, ONU-25 ... ONU-249).

RN2-1 includes a circulator 610 that receives OCG1 through port 610-1 and outputs OCG1 through port 610-2 to input waveguide 612-I of a demultiplexer, such as AWG 612. AWG 612 demultiplexes OCG1, such that each optical signal in OCG1 (i.e., optical signals having wavelengths λ1, λ9, λ17, λ25 ... λ249) is supplied to a corresponding one of output waveguides 612-O1 to 612-O32, and then fed to a corresponding one of ports 614-1 to 614-32 of circulators 616-1 to 616-32, respectively. Each optical signal is then supplied to a corresponding one of ONUs (ONU-1, ONU-9, ONU-17, ONU-25, ... ONU-249).

As further shown in FIG. 6, each ONU optically connected to RN2-1 (i.e., ONU-1, ONU-9, ONU-17, ... ONU-249) provides a corresponding optical signal that makes up OCG1' (i.e., optical signals having wavelengths λ1', λ9', λ17', λ25'...λ249') to respective circulator ports 618-1 to 618-32. Each of circulators 616-1 to 616-32 operate to supply a corresponding one of these optical signals through a respective one of ports 620-1 to 620-32, such that each optical signal is output to a respective input waveguide 628-I1 to 628-I2 of a multiplexer, such as AWG 624. AWG 624 next multiplexes or combines each optical signal onto output 628-O1, so that OCG1' is fed to port 610-3 of circulator 610 and then output through port 610-1 to RN1, as noted above.

The optical connections or links between the OLT and RN1, between remote node RN1 and RN2-1 to RN2-8 (collectively referred to as RN2), and between each remote node RN2 and each ONU, have circulators on each connection end so that each connection may be bidirectional. As a result, both downstream and upstream propagating optical signals may be carried over the same optical communication path, such as an optical fiber. Accordingly, PON 100 may have a simplified design and have reduced expense compared to optical communication systems including optical fibers that carry optical signals propagating in a single direction.

As noted above, optical signals originating in the OLT are transmitted through and demultiplexed by remote nodes RN1 and RN2 and then supplied to ONUs, which may be located at or near customer's premises. Various ONU configurations will next be described with reference to FIGS. 7a to 7h.

Figure 7A:
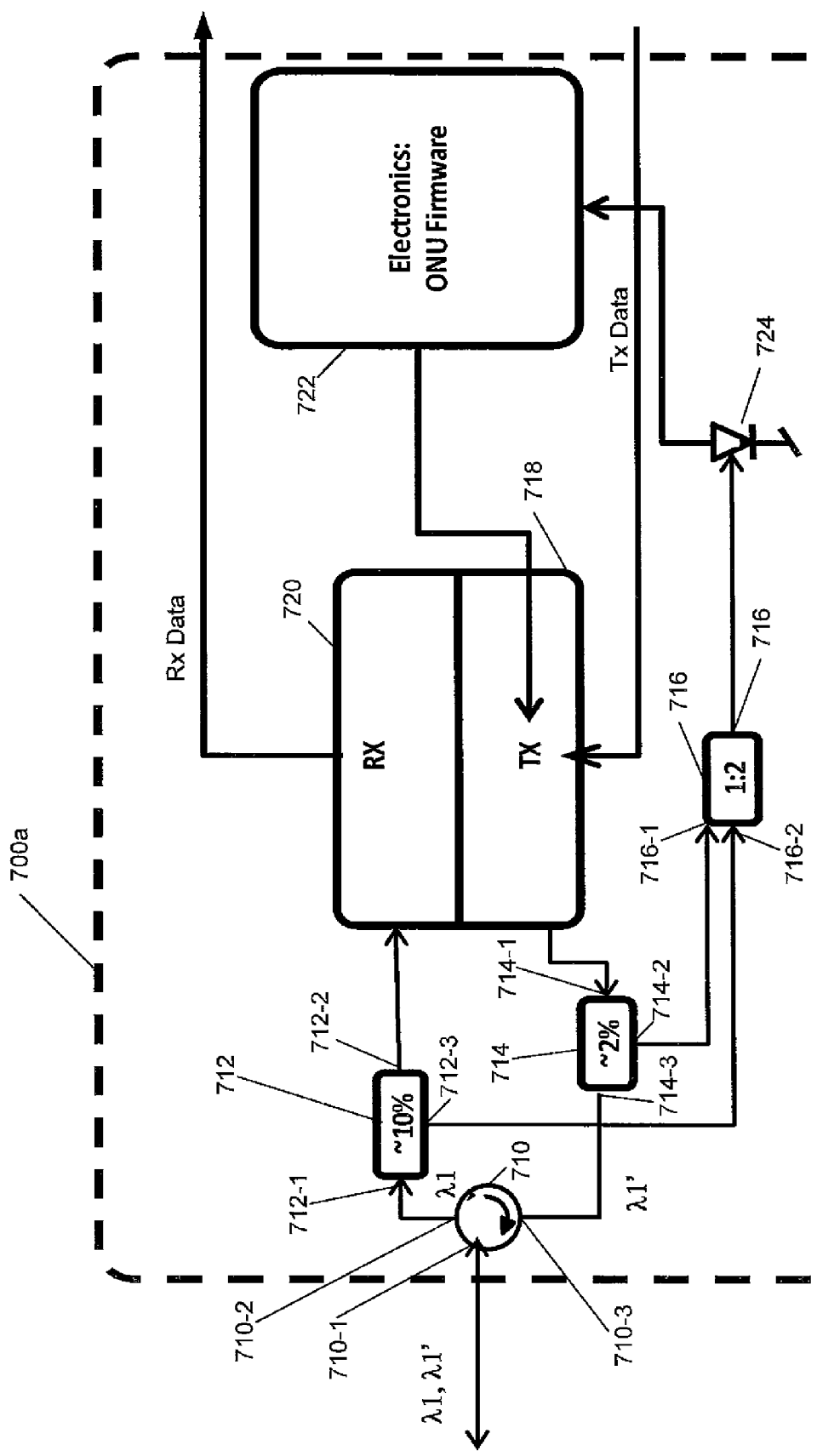
FIGS. 7a to 7h illustrate examples of ONUs consistent with an aspect of the present disclosure.

FIG. 7a illustrates an example of an ONU 700a consistent with an aspect of the present disclosure. As described in greater detail, ONU 700a has a mechanism for controlling or locking an output optical signal wavelength λ1'.

ONU 700a includes a circulator 712 having a port 710-1 that receives an optical signal having wavelength λ1. Circulator 710 outputs the optical signal through port 710-2 to optical tap 712 via input 712-1. Tap 712 may be a 10%, for example, whereby approximately 90% of the optical signal is supplied through output 712-2 to optical receiver or receiver circuit 720. Receiver circuit 720 may output an electrical signal indicative of data (Rx data) carried by the received optical signal portion. Receiver circuit 720 may be part of a known 1 Gigabit/second SFP transceiver and may output electrical signal carrying received data in response to the power split portion of the optical signal from tap 712.

The other portion of the optical signal supplied from output 712-3 of tap 712 may be supplied to input 716-2 of 2:1 power combiner or coupler 716. An optical transmitter 718 may output an optical signal to another tap 714 via input 714-1. Tap 714 may be configured so that a first portion (about 98%, for example) of the optical signal output from transmitter 718 at wavelength λ1' is output from output 714-3 to port 710-3 of circulator 710 and then output from port 710-1 to RN2-1. Approximately 10%, for example, of the input optical signal at wavelength λ1 is supplied to input 716-2 of coupler 716. The combined λ1 and λ1' light is fed to a photodetector circuit including photodiode 724, for example, which supplies an electrical signal or sense signal in response to the combined light. The electrical signal is next fed to firmware, processor circuitry, or control circuit 722.

Preferably, the optical signal output from optical transmitter 718 should have a wavelength λ1' that is spectrally close to wavelength λ1 of the optical signal input to ONU-1, such that the two optical signals "beat" in a known manner when combined. Control circuit 722 may detect such beating in the electrical signal output from photodiode 724. In one example, control circuit 722 (shown as "Electronics: ONU Firmware") may tune wavelength λ1' until such beating is detected, and, at the point wavelength λ1' of the output optical signal from transmitter 718 (and thus the optical signal output from circulator port 710-1) will have a desired value. In a further example, control circuit 722 may step through a series of predetermined wavelengths until the beating is observed, as opposed to a continuous wavelength scan.

Transmitter 718 may include a laser that outputs light having a wavelength in a C-band (in a range of 1525-1565 nm). Also, optical signals at wavelengths λ1, λ1' may be non-return to zero (NRZ) modulated. An advantage of ONU 700a is that it may include a commercially available transceiver having optical receiver 720 and transmitter 718, and thus may be relatively inexpensive to manufacture.

Figure 7B:
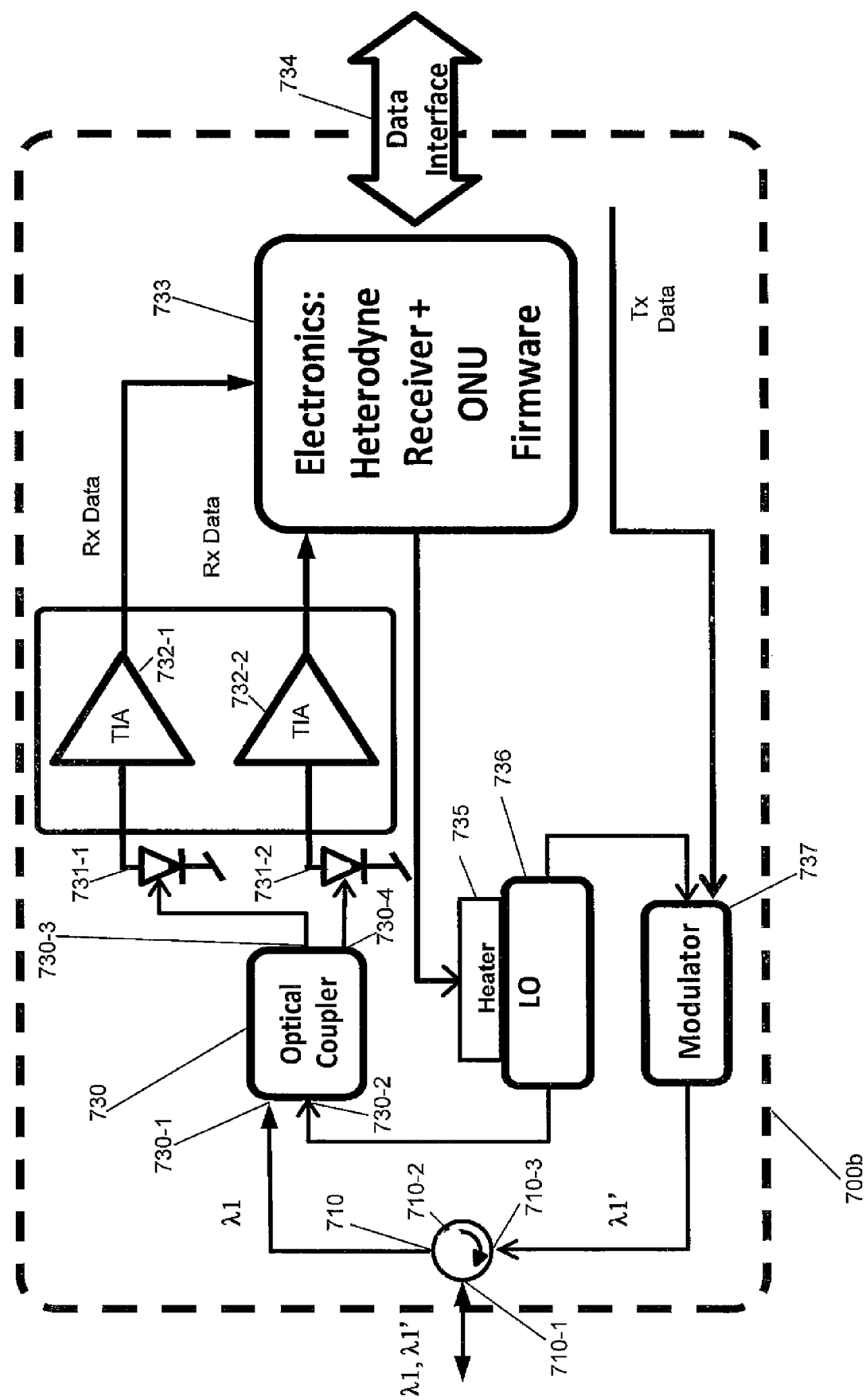

FIG. 7b illustrates a block diagram of ONU 700b, which is another example of an ONU consistent with the present disclosure. ONU 700b includes a circulator 710 having ports 710-1 and 710-2 that operate in a manner similar to that noted above with respect ONU 700a to receive and output optical signal at wavelength λ1. ONU 700b also includes an optical coupler 730 having a fist input 730-1 that receives the optical signal output from circulator port 710-2. Optical coupler 730 also has a second input 730-2 that receives a first optical output from local oscillator laser 736. Optical coupler 730 mixes the light received at inputs 730-1 and 730-2 in a known manner and supplies first and second mixed optical signals to a photodetector circuit including photodiodes 731-1 and 731-2, respectively (collectively referred to as photodiodes 731). Each of photodiodes 731 supplies a corresponding electrical signals carrying data associated with optical signal λ1 to known transimpedance amplifier (TIA) circuits 732-1 and 732-2, that supply corresponding electrical outputs to a control circuit, including, for example, a known heterodyne receiver and firmware circuitry 733. The control circuit may also include a processor circuit or digital signal processor (DSP). Circuitry 733 may output data carried by optical signal λ1 though data interface 734.

As further shown in FIG. 7b, a second optical output from local oscillator 736 may be supplied to modulator 737 (which may include a Mach-Zehnder modulator or electro-absorption modulator). Modulator 737 may modulate the second optical output from local oscillator 736 in accordance with a data signal, which is also supplied to modulator 737, such that the modulated second optical output carries data associated with the data signal (Tx data in FIG. 7b). Such modulated second optical output is preferably at wavelength λ1' and constitutes an optical signal within OCG1'. In a manner similar to that described above, the λ1' optical signal is provided to circulator port 710-3 and output through circulator port 710-1.

As further noted above, wavelength λ1' is preferably spectrally close to wavelength λ1, such that the first optical output of local oscillator 736 and the input optical signal to ONU 700b "beat" in a known manner when combined or mixed in coupler 730. Circuit 733 may detect such beating in the electrical signals output from photodiodes 724 (and TIAs 732-1 and 732-2). In one example, circuit 733 may tune wavelength λ1' until such beating is detected, and, at the point wavelength λ1' of the optical outputs of local oscillator laser 736 (and thus the optical signal output from circulator port 710-1) will have a desired value. In a further example, control circuit 733 may step through a series of predetermined wavelengths until the beating is observed, as opposed to a continuous wavelength scan.

In a further example, such tuning may be realized by supplying a control signal from circuitry 733 to a heater 735, such as a thin film heater, which is thermally coupled to local oscillator laser 736 to adjust the temperature, and thus, the wavelength of light output from local oscillator 736. Accordingly, the temperature of local oscillator 736 may be changed so that the optical outputs therefrom have the desired wavelength. Typically, heater 735 may tune laser 736 over a relatively narrow range. If tuning is desired over a relatively wider range, however, a multi-section tunable laser may be provided as local oscillator 736.

Local oscillator laser 736 may include a laser that outputs light having a wavelength in a C-band (in a range of 1525-1565 nm). Also, optical signals at wavelengths λ1, λ1' may be non-return to zero (NRZ) modulated.

Figure 7C:
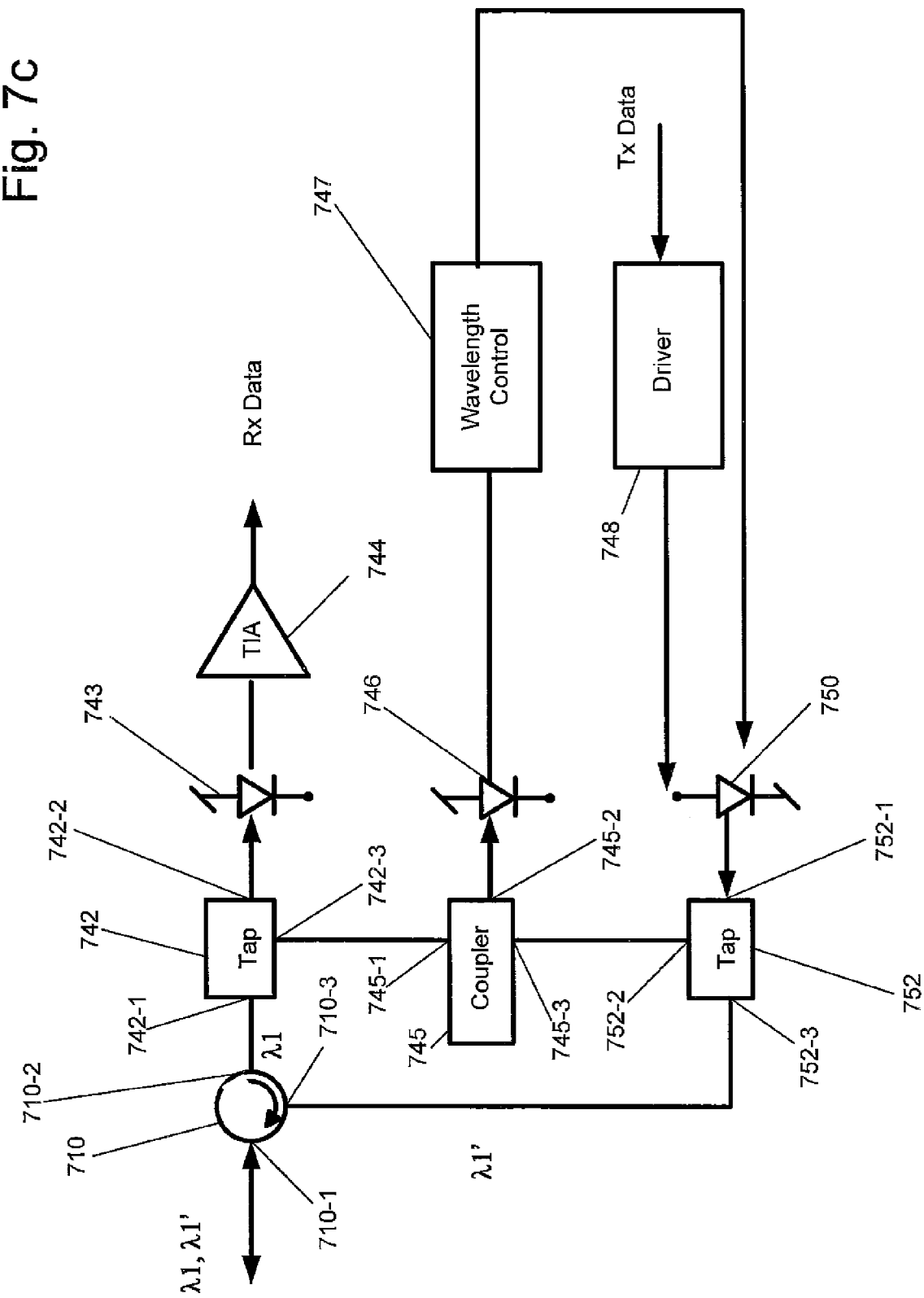

FIG. 7c illustrates a block diagram of ONU 700c, which is a further example of an ONU consistent with the present disclosure. ONU 700c includes a circulator 710 having ports 710-1 and 710-2 that operate in a manner similar to that noted above with respect ONU 700a to receive and output optical signal at wavelength λ1. The optical signal output form port 710-2 is provided to input 742-1 of tap 742, which, in turn, supplies a first portion of the optical signal at tap output 742-2 and a second portion of the optical signal at tap output 742-3. A photodetector circuit, including photodiode 743, for example, receives the first portion of the optical signal and generates a corresponding electrical signal that is amplified and/or conditioned by TIA 744, which supplies a further electrical signal carrying the data associated with optical signal λ1.

The second optical signal portion output having wavelength λ1 and output supplied from tap output 742-3 is provided to input 745-1 of coupler 745-3. Coupler or combiner 745 has a second input 745-3 that receives a portion of light or an optical signal (having wavelength λ1') generated by laser 750 (including a laser diode, for example) from tap port 752-2. Output 745-2 of coupler 745 supplies a combined or mixed optical signal to a photodetector circuit including photodiode 746, which supplies a corresponding electrical signal to wavelength control circuit 747. Wavelength control circuit 747 includes known circuitry, similar to that described above, that detects or identifies when the optical signal portions (having wavelengths λ1 and λ1') supplied to coupler 745 beat with one another. At this point, wavelength λ1' of the optical signal output from laser 750 (including a forward biased semiconductor laser diode, for example) may be considered to have a desired value. Prior to detecting the desired wavelength λ1', wavelength control circuit 747 may step laser 750 in a known manner through a series of predetermined wavelengths (e.g., in 25 GHz increments), until beating is sensed.

Preferably, each of optical signal wavelengths λ1 to λ256 conform to a predetermined grid, and the values of each wavelength may be stored in wavelength control circuit 747. Accordingly, a wavelength detected by wavelength control circuit 747 may be readily associated with one of the grid wavelengths, such that additional signal processing may not be necessary.

As further shown in FIG. 7c, data to be carried by optical signals at wavelength λ1 (as part of OCG1'), may be supplied to a driver circuit 748, which, in turn, may supply appropriate drive signals based on a received data stream (Tx data) to directly modulate laser 750. As a result, a second portion of the optical signal output from laser 750 through tap output 752-3 constitutes optical signal λ1' that is output from ONU 700c via circulator ports 710-3 and 710-1.

ONU 700c has a simpler design that those discussed. In addition, optical signals having wavelengths λ1 and λ1' may be NRZ modulated at 1 Gigabit/second or higher (e.g., 10 Gigabit/second, 40 Gigabit/second 100 Gigabit/second), and the TIA may be co-packaged with the other component shown in FIG. 7c.

Figure 7D:
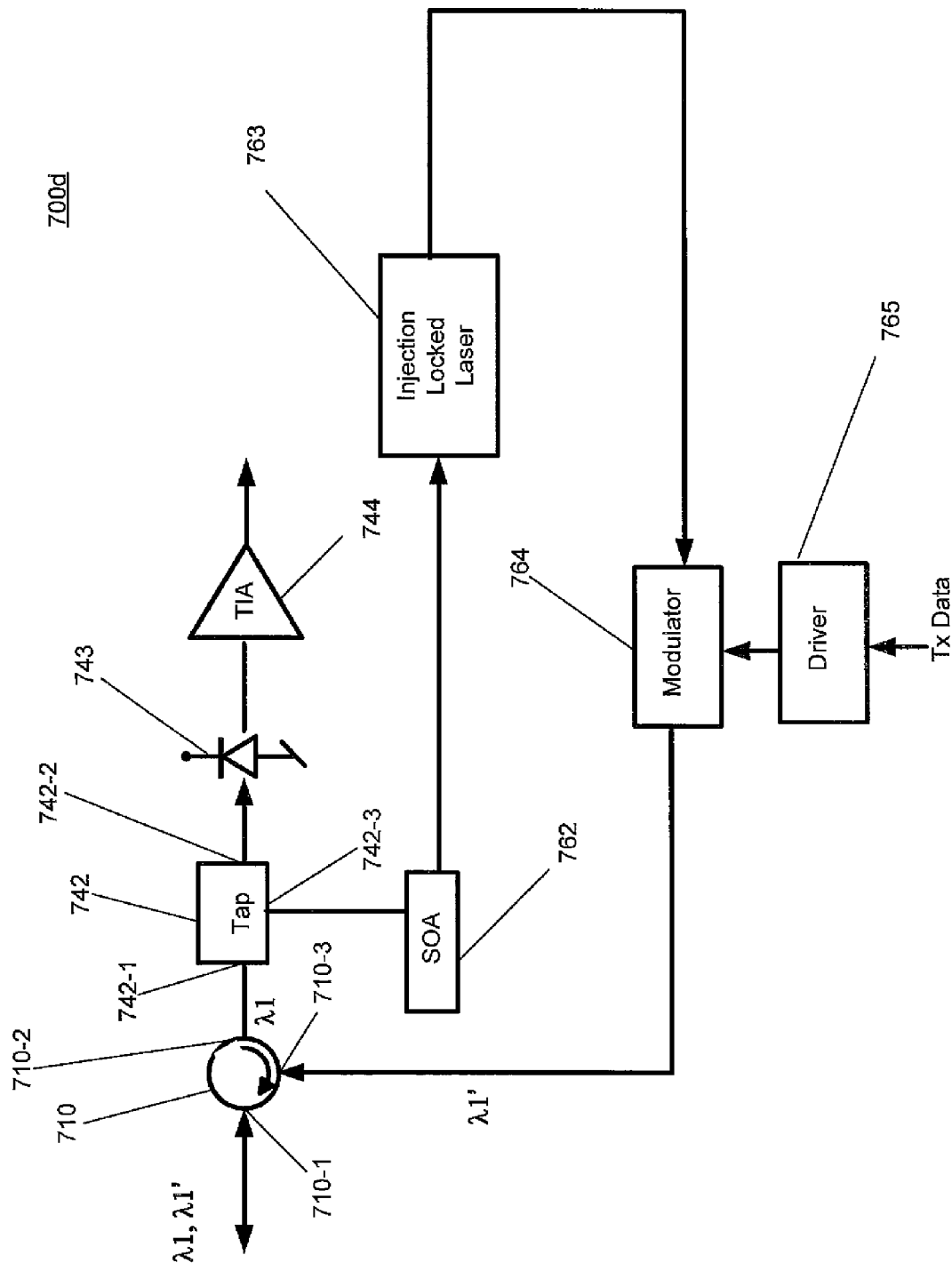

FIG. 7d illustrates ONU 700d, consistent with a further example consistent with the present disclosure. ONU 700d, like ONU 700c, includes circulator 710, tap 742, photodiode 743 and TIA 744 that outputs electrical signals carrying data associated with optical signal λ1. In ONU 700d, however, coupler 745, wavelength control circuit 747, tap 752, and laser 750 are omitted. Instead, an optical amplifier, such as semiconductor optical amplifier (SOA) 762, amplifies the optical signal supplied by tap output 742-2, and the amplified optical signal portion is provided to a known injection locked laser 763, which, in response to the output from SOA 762, supplies a further optical signal at wavelength λ1' in a known manner. Optical signal wavelength λ1' is may be the same or substantially the same as wavelength λ1, and is thus locked to wavelength λ1. The λ1' optical signal may then be modulated by an external modulator 764, including an electro-absorption modulator or Mach-Zehnder modulator to modulate the output from injection locked laser 763 in accordance with a drive signal from driver circuit 765. Driver circuit 765, receives data or a data stream (Tx data), such that the modulated optical signal output from modulator 764 (i.e., optical signal λ1 of OCG1') carries the Tx data. Optical signal λ1' may then be output from ONU 700d via circulator ports 710-3 and 710-1.

ONU 700d is advantageous in that it has relatively few components, has a simple design, and may be monolithically integrated on substrate, such as an indium phosphide (InP) substrate. As in the examples, discussed above the λ1, λ1' optical signals may be NRZ modulated at data rate of 1 Gigabit/second. In addition, TIA 744 may be co-packaged with the other components shown in FIG. 7d.

Figure 7E:
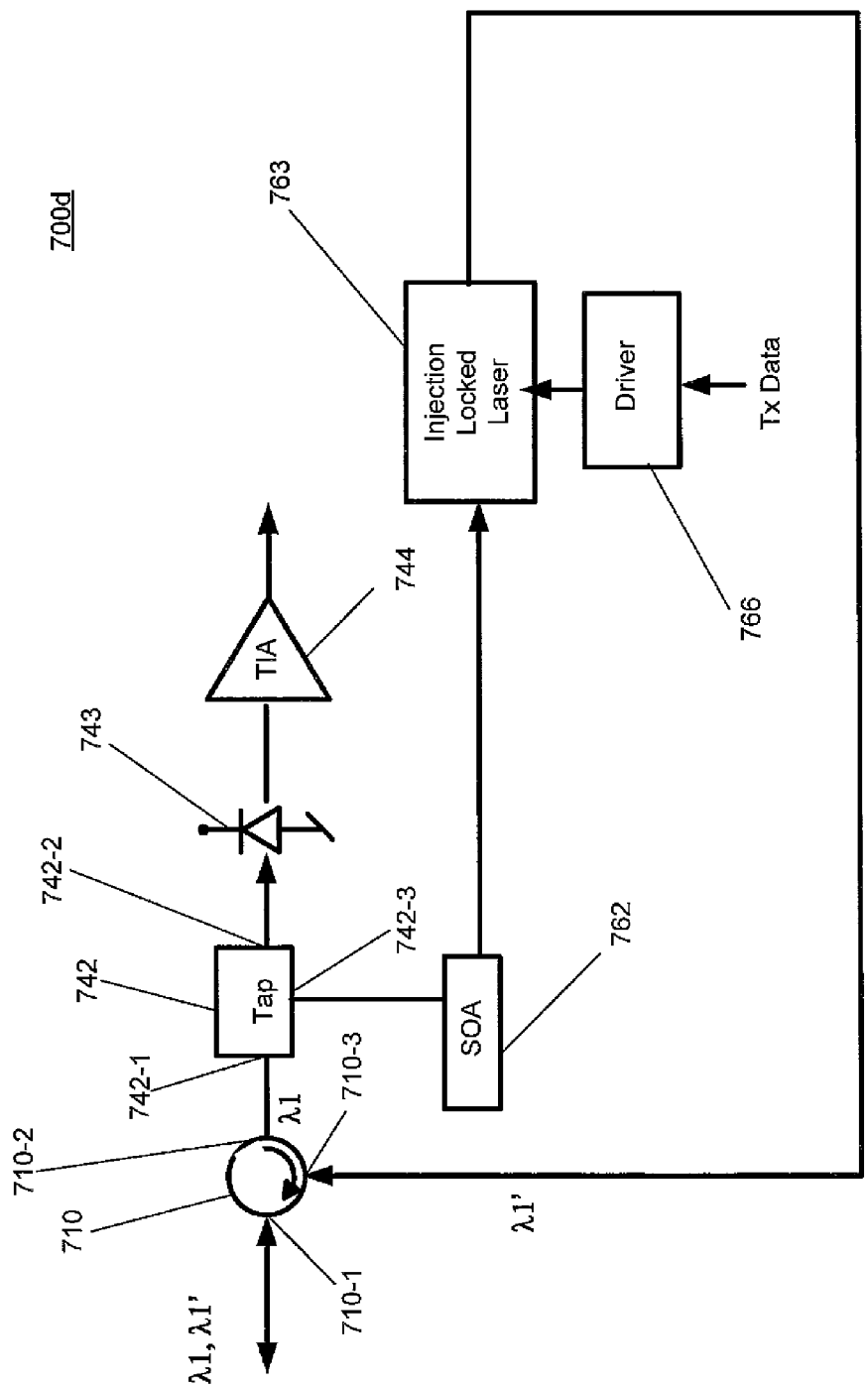
Figure 7F:
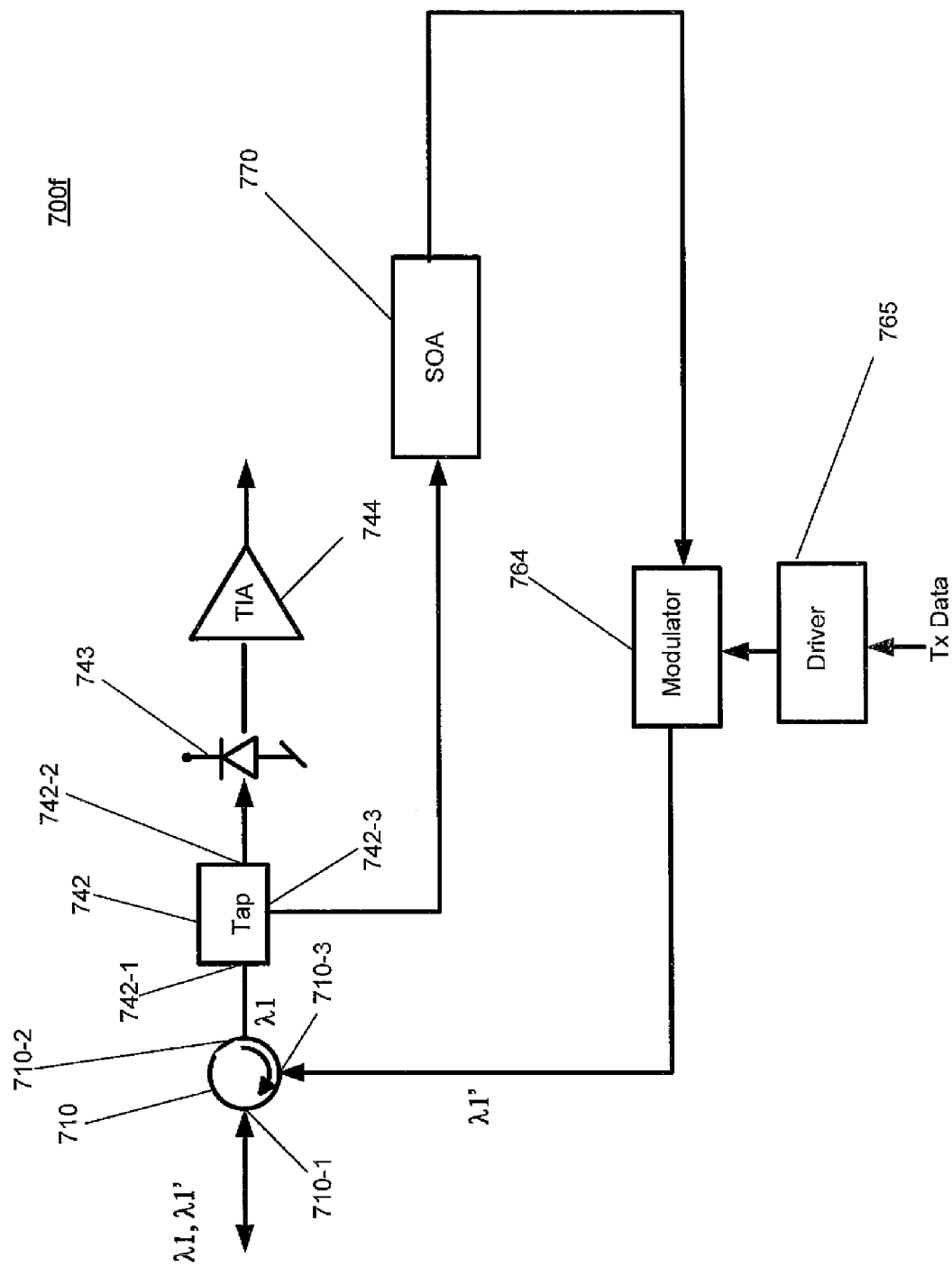
Figure 7G:
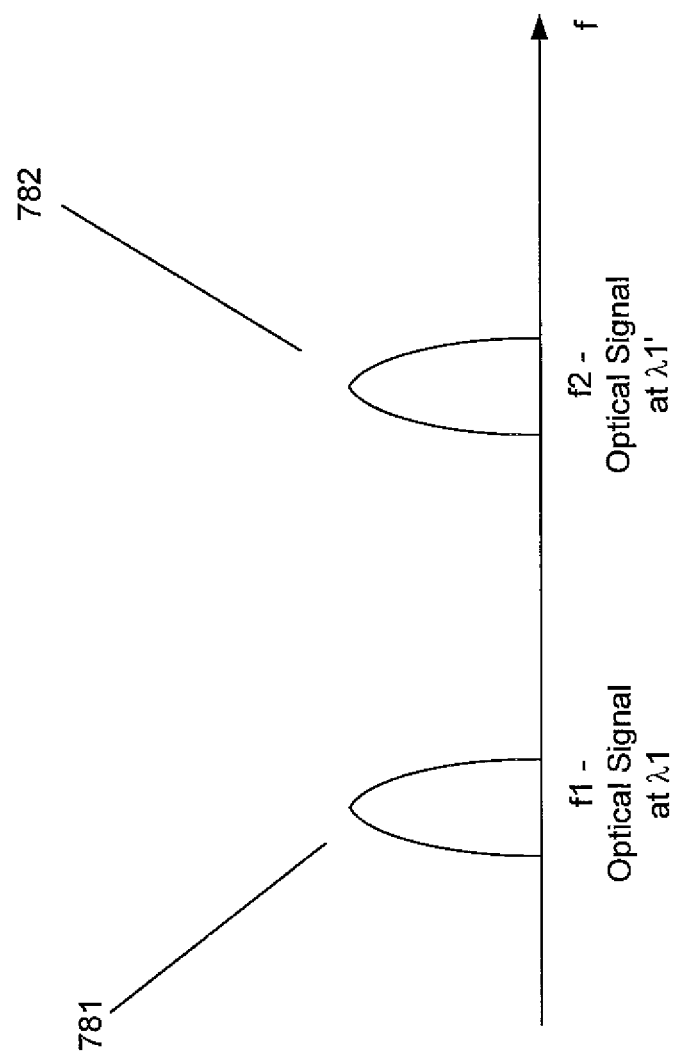
Figure 7H:
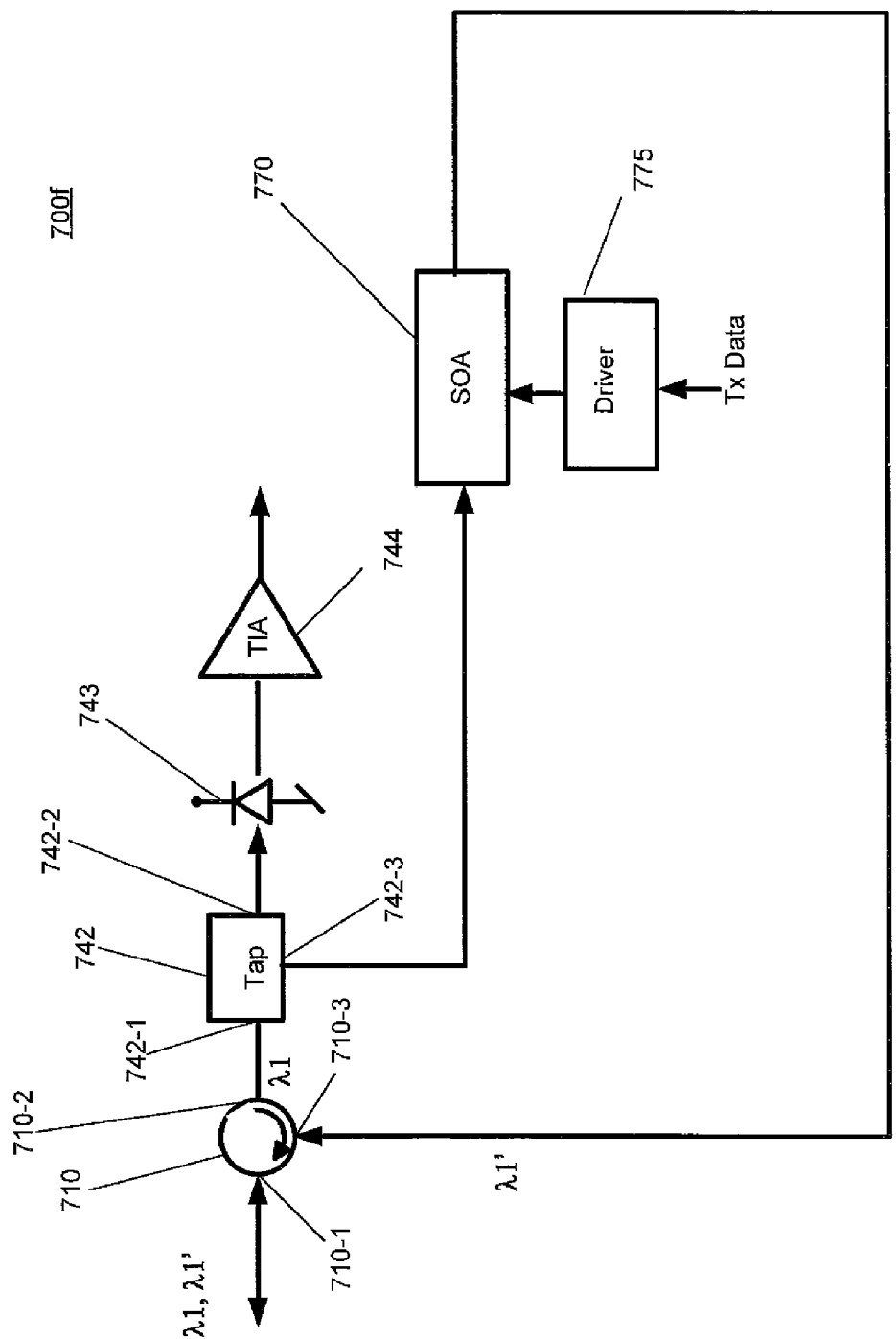

In a further example, shown in FIG. 7e, injection locked laser 763 is directly modulated by driver circuit 766.

ONU 700f (see FIG. 7f) is similar to ONU 700e except injection locked laser 763 and SOA 762 are replaced by SOA 770. In this example, a portion of optical signal λ1 is supplied to semiconductor optical amplifier 770, which outputs a corresponding amplified optical signal to modulator 764. A data stream (Tx data) may be supplied to driver circuit 765, which, in turn, supplies an appropriate drive signal to modulator 764 to thereby modulate the amplified optical signal to carry the Tx data. In this example, λ1' is equal to or substantially equal to λ1.

In one example, the portion of optical signal λ1 includes a first radio frequency (RF) sub carrier 781 (see FIG. 7g) at frequency f1. Although SOA 770 amplifies the light at frequency f1 SOA may also amplify light at frequency f2. Accordingly, modulator 764 may modulate the amplified optical signal output from SOA 770 in accordance with a known sideband modulation format to modulate a second RF subcarrier 782 at frequency f2 different than f1. Accordingly, RF subcarrier 782 may be modulated to carry a different data stream (the Tx data) than that carried by RF subcarrier 781. RF subcarrier 782 may thus correspond to optical signal λ1' of OCG1' and be output via circulator ports 710-3 and 710-1.

Modulator 764 may include a known electro-absorption modulator (EAM) or a Mach-Zehnder modulator that modulates the amplified optical signal at a data rate of 1 gigabit/second, for example. In another example, modulator 764 may be omitted and SOA 770 may be directly modulated by driver circuit 775 in accordance with received data stream Tx data. In both FIGS. 7f and 7h, the optical signals input to and output from ONU 700f may be NRZ modulated.

In sum, OLT and ONU configurations consistent with the present disclosure may have reduced costs and a relatively simple design. Accordingly, PONs including such configurations may readily scale to a relatively large number of subscribers.

Other embodiments will be apparent to those skilled in the art from consideration of the specification. For example, the numbers and value of optical signals, optical signal wavelengths, as well as the number of various components (e.g., photodiodes, optical sources, waveguides ONUs, OLTs, etc.) discussed above is illustrative only. It is understood that any appropriate number of such optical signals, wavelengths and components may be provided. It is intended that the specification and examples be considered as exemplary only, with a true scope and spirit of the invention being indicated by the following claims.

What is claimed is:

1. An apparatus, comprising:
   a substrate;
   a plurality of optical sources provided on the substrate, each of the plurality of optical sources supplying a corresponding one of a first plurality of optical signals, each of the first plurality of optical signals having a corresponding one of a first plurality of wavelengths;
   a plurality of photodiodes provided on the substrate;

a first arrayed waveguide grating (AWG) provided on the substrate, the first AWG having a plurality of first input waveguides and a second input waveguide, and a first output waveguide and a plurality of second output waveguides, wherein each of the plurality of first input waveguides receives a corresponding one of the first plurality of optical signals, and the second output waveguide supplies a first wavelength division multiplexed (WDM) optical signal, and the second input waveguide receives a second WDM optical signal including a second plurality of optical signals, each of which having a corresponding one of a second plurality of wavelengths, each of the plurality of second output waveguides supplying a corresponding one of the second plurality of optical signals to a respective one of the plurality of photodiodes; and a second AWG having a plurality of input waveguides, one of which receiving the first WDM optical signal, the second AWG having an output waveguide, each of the first plurality of wavelengths being spectrally spaced from one another such that the first WDM optical signal is output from the output waveguide of the second AWG, wherein the substrate is a first substrate, the plurality of optical sources is first plurality of optical sources, the plurality of photodiodes is a first plurality of photodiodes, the apparatus further including:

a second substrate;

a second plurality of optical sources provided on the second substrate, each of the second plurality of optical sources supplying a corresponding one of a third plurality of optical signals, each of the third plurality of optical signals having a corresponding one of a third plurality of wavelengths;

a second plurality of photodiodes provided on the second substrate;

a third AWG provided on the second substrate, the third AWG has a plurality of first input waveguides and a second input waveguide, the third AWG further having a first output waveguide and a plurality of second output waveguides, wherein each of the plurality of first input waveguides of the third AWG receives a corresponding one of the third plurality of optical signals, and the second output waveguide of the third AWG supplies a third wavelength division multiplexed (WDM) optical signal, the second input waveguide of the third AWG receives a fourth WDM optical signal including a fourth plurality of optical signals, each of which having a corresponding one of a fourth plurality of wavelengths, each of the plurality of second output waveguides of the third AWG supplying a corresponding one of the fourth plurality of optical signals to a respective one of the second plurality of photodiodes, and each of the third plurality of wavelengths being spectrally spaced from one another such that the third WDM optical signal is output from the output waveguide of the second AWG.

2. An apparatus in accordance with claim 1, wherein each of the first plurality of wavelengths is different than each of the second plurality of wavelengths.

3. An apparatus in accordance with claim 1, further including:

a fourth AWG having an input waveguide that receives the second and fourth WDM optical signals, and a plurality of output waveguides, a first one of which supplies the second WDM optical signal and a second one of which supplies the fourth WDM optical signal.

4. An apparatus in accordance with claim 3, further including a fifth AWG having an input waveguide that receives the first and third WDM optical signals and a first output waveguide that supplies the first WDM optical signal and a second output waveguide that supplies the third WDM optical signal.

5. An apparatus in accordance with claim 4, further including:

a first optical demultiplexer configured to receive the first WDM optical signal from the first output waveguide of the fifth AWG, the first optical demultiplexer having a plurality of outputs, each of which supplying a corresponding one of the first plurality of optical signals; and a second optical demultiplexer configured to receive the third WDM optical signal from the second output of the fifth AWG, the second optical demultiplexer having a plurality of outputs, each of which supplying a corresponding one of the third plurality of optical signals.

6. An apparatus in accordance with claim 5, further including:

a first optical network unit (ONU) coupled to one of the plurality of outputs of the first optical demultiplexer, the first ONU receiving one of the first plurality of optical signals and outputting one of the second plurality of optical signals; and a second ONU coupled to one of the plurality of outputs of the second optical demultiplexer, the second ONU receiving one of the second plurality of optical signals and outputting one of the fourth plurality of optical signals.

7. An apparatus in accordance with claim 6, further including an optical multiplexer configured to receive said one of the second plurality of optical signals, and output the second WDM optical signal.

8. An apparatus in accordance with claim 6, wherein the first ONU includes:

a port that receives said one of the first plurality of optical signals and outputs said one of the second plurality of optical signals;

a first tap having first and second outputs, the first tap receiving said one of the first plurality of optical signals from the port, the first output of the first tap supplying a first portion of said one of the first plurality of optical signals, the second output of the first tap supplying a second portion of said one of the first plurality of optical signals;

an optical receiver circuit configured to receive the first portion of said one of the first plurality of optical signals;

a transmitter supplying an output optical signal, the output optical signal having a wavelength;

a second optical tap having an input and first and second outputs, the first output of the second optical tap supplying a first portion of the output optical signal as said one of the second plurality of optical signals, and the second output of the second optical tap supplying a second portion of the output optical signal;

an optical coupler having first and second inputs and an output, the first input of the optical coupler receiving the second portion of said one of the first plurality of optical signals and the second input of optical coupler receiving the second portion of the output optical signal, the output of the optical coupler supplying a combined optical signal including the second portion of said one of the first plurality of optical signals and the second portion of the output optical signal; and a photodetector circuit configured to receive the combined optical signal and generate an electrical signal in response thereto; and a control circuit configured to adjust the wavelength of the output optical signal in response to the electrical signal.

9. An apparatus in accordance with claim 8, further including an optical circulator, the optical circulator having a first port that supplies said one of the first plurality of optical signals to the input of the first optical tap, and a second port that receives said one of the second plurality of optical signals from the first output of the second tap.

10. An apparatus in accordance with claim 8, wherein the photodetector circuit includes a photodiode that receives the combined optical signal and generates the electrical signal.

11. An apparatus in accordance with claim 8, wherein the optical receiver circuit includes a photodiode that is configured to receive the first portion of said one of the first plurality of optical signals.

12. An apparatus in accordance with claim 8, wherein the transmitter includes a laser diode, which is directly modulated in accordance with a data stream.

\* \* \* \* \*